United States Patent [19]

Papendick et al.

[11] Patent Number: 5,037,680
[45] Date of Patent: Aug. 6, 1991

[54] EXTERIOR AUTOMOTIVE COMPONENT WITH PIGMENTED SUBSTRATE AND CLEAR COATING

[75] Inventors: Gerd Papendick, New Market; Wilfred Fiege, Mount Albert; Alan J. Power, Bradford, all of Canada

[73] Assignee: Decoma International Inc., Concord, Canada

[21] Appl. No.: 377,173

[22] Filed: Jul. 10, 1989

[51] Int. Cl.$^5$ ................ B60R 13/00; B60R 19/02
[52] U.S. Cl. .................... 428/31; 293/142; 428/208
[58] Field of Search ............ 428/31, 204, 208; 293/142

[56] References Cited

U.S. PATENT DOCUMENTS

| | | | |
|---|---|---|---|
| 1,566,839 | 12/1925 | Denels | 293/120 |
| 3,493,257 | 2/1970 | Fitzgerald et al. | 428/31 X |
| 4,268,552 | 5/1981 | Duvdevani et al. | 428/31 |
| 4,305,981 | 12/1981 | Muroi et al. | 428/31 |
| 4,314,933 | 2/1982 | Berner | 428/425.8 X |
| 4,344,876 | 8/1982 | Berner | 428/460 X |
| 4,369,225 | 1/1983 | Manabe et al. | 428/31 X |
| 4,412,016 | 10/1983 | Fukui et al. | 524/451 X |
| 4,426,471 | 1/1984 | Berner | 428/460 X |
| 4,426,472 | 1/1984 | Berner | 428/460 X |
| 4,810,540 | 3/1989 | Ellison et al. | 428/208 X |
| 4,902,557 | 2/1990 | Rohrbacher | 428/31 X |
| 4,931,324 | 6/1990 | Ellison et al. | 428/31 |

FOREIGN PATENT DOCUMENTS

WO86/04912  8/1986  PCT Int'l Appl. .............. 428/31

*Primary Examiner*—Henry F. Epstein
*Attorney, Agent, or Firm*—Cushman, Darby & Cushman

[57] ABSTRACT

An exterior automotive vehicle component which is provided for exterior appearance purposes or is of such large size as to materially contribute to the exterior appearance of the vehicle. The component comprises a substrate of thermoplastic polyolefin composition defining the shape of the component having pigmentation therein defining the color of the exterior surface means and a coating of clear material on the exterior surface of the substrate enabling the exterior color and configurational appearance to have an enhanced luster and improved mar resistance. The composition has an ultraviolet radiation deterioration preventing agent therein and the clear material has an ultraviolet radiation screening agent therein. The amount of ultraviolet radiation screening in the clear material cooperating with the amount of ultraviolet radiation deterioration preventing agent in the composition such as to provide a level of resistance to UV deterioration acceptable in the exterior vehicular environment of the component while accommodating a tenacity of adherence in the exterior vehicular environment of the component.

11 Claims, 1 Drawing Sheet

EXTERIOR AUTOMOTIVE COMPONENT WITH PIGMENTED SUBSTRATE AND CLEAR COATING

This invention relates to automobiles and similar vehicles and, more particularly, to exterior components of such vehicles which are either provided for appearance purposes or are of such size as to make a contribution to the exterior appearance of the vehicle.

The invention is best exemplified as a bumper fascia. However, other examples include accent stripes, side door bumper elements, claddings, and wheel covers. Another good example is the skirt that is provided on some sports-type cars. Basically, the invention applies to those exterior components of the automobile which have heretofore been made of plastic materials, specifically polyolefins. It will be understood that the invention also has applicability to larger components, such as door sides, trunk lids, where plastic components have been utilized heretofore. Typically, the plastic components which have been heretofore utilized are formed of injection molded thermoplastic polyolefins, referred to simply as TPO. The overwhelmingly dominant procedure is to paint the exterior surface of the molded component a color which is compatible with the appearance of the automobile which may be either a similar color to the body or a contrasting neutral color thereto. Thereafter, a so-called clear coat final coating is sprayed on the paint to give it desired luster, mar resistance and ultraviolet protection. Heretofore, it has been necessary to prepare the exterior surfaces of the molded component or substrate either by applying a primer or by other means which promotes adhesion of the paint to the surface of the molded substrate. In this dominant practice, the color appearance of the component comes from the pigmentation in the intermediate paint layer. Where it is desired that the color be "metallized", the practice is to put fine metallizing particles in the paint which allows both the color pigmentation and the particles to show through and present the appearance. The term "metallized" is used herein in its functional sense since the metallizing particles need not be metal particles. While aluminum particles are often used so are mica particles. The final coating which is thereafter applied enhances the luster. Recently, formulations have been proposed for the substrate which promote paint adhesion to the point that a primer and/or adhesion promoter coat can be eliminated. See PCT published patent application WO 8604912.

In addition to this dominant practice, there have been a few car models where an exterior plastic component such as a bumper fascia has been utilized simply as a molded product in the condition which it comes out of the mold. In this case, the plastic which is used to injection mold the component is loaded with pigmentation so that the desired color appears not only on the surface but throughout the molded substrate which forms the component. The surface which is provided by the molded bumper fascia while initially presenting a desirable color lacks luster and, in fact, presents a surface which can be easily scratched and marred to further detract from its lackluster.

The characteristics which are required of an exterior vehicular component are quite stringent. First, the component must be capable of maintaining its form without becoming too soft in very hot weather or too brittle in extreme cold weather. Moreover, the product must be capable of withstanding deterioration as a result of exposure to the ultraviolet rays of the sun often in a most direct and harsh fashion. Particularly in the case of a bumper fascia, the plastic component must be capable of a slight amount of local flexure without permanently deforming or denting. Similarly, any coating thereon must have elastomeric properties sufficient to prevent flaking and scaling which would materially affect the appearance. Of course, in all of these components, the surface appearance is of importance and it is usually regarded to be desirable that the surface appearance has considerable luster. Thus, the coatings while being elastomeric must likewise have an adherence which is tenacious. With the two existing practices, it will be readily apparent that producing an uncoated plastic bumper fascia which is pigmented in the mold is considerably less costly than molding the same non-color matched component, applying a primer or otherwise treating the surface for adhesion promotion, applying a coating of paint and then applying a clear coat on top of the paint. Essentially, the increased cost involved is substantial and is provided solely for appearance purposes and specifically for the purpose of achieving the type of lustrous finish which can be achieved through the multiple coatings provided.

A difficult characteristic to build into products of this type is resistance to ultraviolet deterioration. A problem with UV stabilizers is that, when they are added to the TPO in specific quantity to constitute the major protection against UV deterioration of the substrate, they may seriously affect the ability of the paint to adhere to TPO. Indeed, the present state of the prior art reflects this condition. That is, where the substrate is to be subsequently painted, the paint itself includes opacity and UV screeners which provide the major part of the protection against UV deterioration. On the other hand, where the substrate itself is pigmented, the UV protection for the resin must be embodied in the TPO as an additive and heretofore the pigmented TPO products which have been utilized are utilized without any subsequent coating and indeed if these existing products were to be coated with typical clear coats, the coating may not sufficiently adhere thereto. Consequently, there exists a need for a product which can achieve both the advantages of a painted substrate and a pigmented substrate without the disadvantages thereof.

It is an object of the present invention to fulfill that need. In accordance with the principles of the present invention, this objective is achieved by providing an exterior automotive vehicle component which is provided for exterior appearance purposes or is of such large size as to materially contribute to the exterior appearance of the vehicle comprising a substrate of thermoplastic polyolefin composition defining the shape of the component. The substrate has exterior surfaces defining the configurational appearance of the component. The composition has pigmentation therein defining the exterior color of the exterior surfaces. A coating of clear material is applied on the exterior surfaces enabling the exterior color and configurational appearance to have an enhanced luster. The composition has an ultraviolet radiation deterioration preventing agent therein and the clear material has an ultraviolet radiation screening agent therein. The amount of ultraviolet radiation screening agent in the clear material cooperates with the amount of ultraviolet radiation deterioration preventing components in the composition such as to provide a level of resistance to UV deterioration acceptable in the exterior vehicular environment of the component while accommodating a tenacity of adherence of the coating to the substrate acceptable in the exterior vehicular environment of the component.

Another object of the present invention is the provision of a product of the type described in which the color appearance of the product can be metallized in a cost effective manner. In accordance with the principles of the present invention, this objective is obtained by including the fine metallizing particles evenly distributed in the coating, the amount of particles being such that the pigmentation color of the substrate is presented as the color appearance of the component with the particles imparting a three-dimensional metallized enhancement to the color appearance. This enhanced color appearance is achieved with several cost effective advantages. First, it does not materially affect the labor costs in manufacturing the finished product since the final coating must be sprayed on and metallizing can be achieved simply by loading the clear coat spray with a sufficient amount of particles. The second cost effective feature of this aspect of the invention is that a substantially lesser number of particles can be utilized since substantially all of the particles will contribute to the metallized appearance because they are suspended in the clear coat whereas in prior practices a significant amount of the metallizing particles are submerged in the paint layer where they do not show and hence a greater amount was required.

Another object of the present invention is the provision of an exterior automotive vehicle component of the type described which is simple in construction, economical to manufacture, and effective in operation.

These and other objects of the present invention will become more apparent during the course of the following detailed description and appended claims.

The invention may best be understood with reference to the accompanying drawings wherein an illustrative embodiment is shown.

Figure 1:
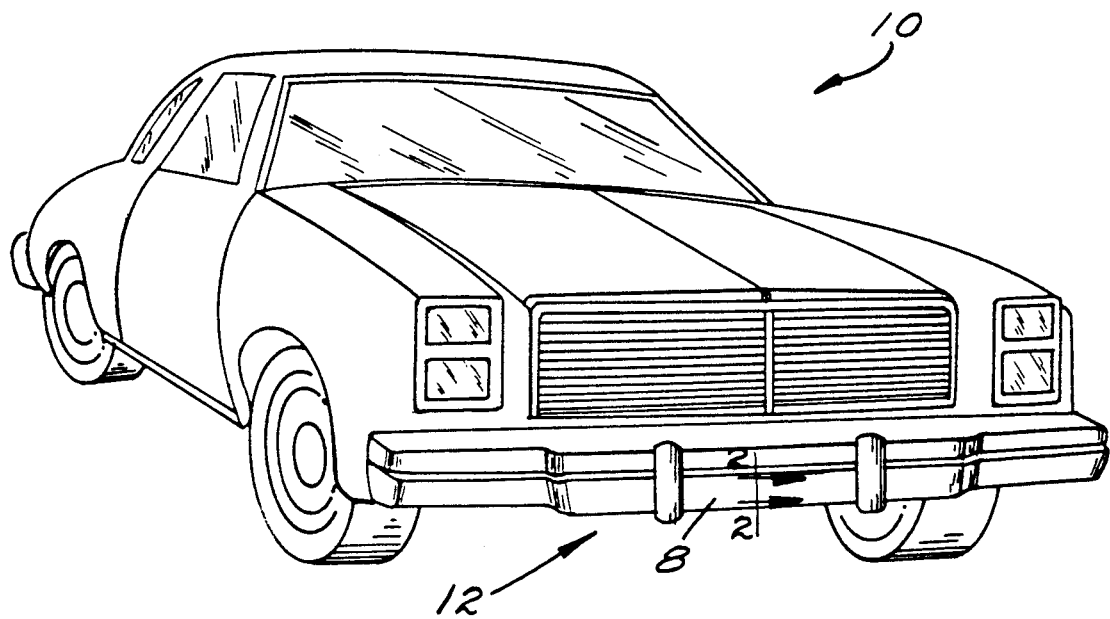
FIG. 1 view is a perspective view of an automobile showing a bumper fascia thereof constructed in accordance with the principles of the present invention.
Figure 2:
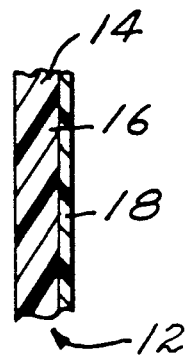
FIG. 2 is an enlarged fragmentary sectional view taken along the line 2—2 of FIG. 1.

Referring now more particularly to the drawings, there is shown in FIG. 1 a perspective view of an automotive vehicle, generally indicated at 10, the automotive vehicle shown is a typical coupe which exemplifies the type of automotive vehicles to which the present invention is applicable. It will be understood that all other types of automotive vehicles, such as sedans, sports cars, station wagons, limousines, trucks and the like, are also within the contemplation of the present invention. The invention has to do more particularly with the construction of a component or components of an automotive vehicle and specifically a component, such as a bumper fascia 12, which is provided for exterior appearance purposes or is of such large size as to materially contribute to the exterior appearance of the vehicle. As previously indicated, while a bumper fascia presents the best exemplification of the invention, the invention is also applicable to other exterior components of automotive vehicles which have heretofore been made of thermoplastic materials, specifically polyolefins. The invention has particular applicability to large components such as door sides, wheel covers, and trunk lids where plastic components have been utilized heretofore.

In accordance with the principles of the present invention, the bumper fascia 12 is formed of a substrate 14 of thermoplastic polyolefin composition which defines the shape of the bumper fascia. The substrate 14 is a molded component. As shown, the substrate includes exterior surfaces 16 which define the configurational appearance of the bumper fascia. The composition of the substrate 14 will be more particularly described hereinafter but for present purposes it is sufficient to note that it contains pigmentation defining the exterior color of the exterior surfaces 16 of the substrate. A coating 18 of clear coat material is applied on the exterior surfaces 16 enabling the exterior color and configurational appearance to have an enhanced luster.

The color pigmented thermoplastic substrate 14 forming the component or bumper fascia 12 of the present invention comprises a polyolefinic thermoplastic resin (TPO), color producing pigments and additives, ultraviolet stabilizers, and other additives conventionally used in thermoplastic resins for producing automotive exterior components, such as bumper fascia of an automotive vehicle.

The polyolefinic thermoplastic resins (TPO) that can be used include crystalline polyolefin thermoplastic resins such as high and low density polyethylene, crystalline polypropylene, crystalline poly-1-butene, crystalline ethylene/1-olefin copolymers such as crystalline ethylene-propylene copolymers, and the like, and blends of these resins with other resins (modified TPO) to improve impact resistance or other properties. Modified TPO generally contains about 70 per cent by weight of a polyolefinic thermoplastic resin and the balance a modifying polymer. Blends that can be used include those containing polyolefin resins and compatible elastomers, e.g. olefin-diene copolymers, butadiene-styrene copolymers, acrylonitrile-butadiene copolymers and other rubber materials, and acid copolymers, such as copolymers of ethylene and ethylenically unsaturated carboxylic acids such as acrylic acid or methacrylic acid. There are many thermoplastic olefin compositions known that can be used as the substrate of the invention.

The color imparted to the substrate formed from the polyolefinic thermoplastic resin composition can be accomplished by ingredients and techniques known in the art. The color pigmentation of the resin is carried out to produce a desired value on a particular color chart. Typically, the coloration is provided to the resin substrate utilizing such things as various combinations of titanium dioxide, blue tone phthalocyanine green, yellow tone phthalocyanine green, green tone phthalocyanine blue, and lamp black or carbon black. The amounts of color additives and the particular combinations used to achieve the desired color of the thermoplastic resin are known to those skilled in the art. For example, black molded articles formed from TPO and modified TPO generally contain about 1–4% by weight of carbon black. In this situation, carbon black performs a dual function of imparting color and as a UV absorber.

Ultraviolet radiation deterioration preventing agents that can be used in the thermoplastic resin substrate include carbon black, white pigments, other pigments that absorb and/or reflect ultraviolet radiation, organic ultraviolet stabilizers such as hydroxybenzophenones, hydroxyphenylbenzotriazoles, alpha-cyanoacrylates, oxanilides, salicylates, hindered amines, and the like, and mixtures thereof. Very useful organic ultraviolet stabilizers that can be used are hindered amine light stabilizers (HALS).

Typical useful substituted benzophenones have the structural formula

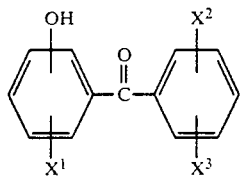

wherein $X^1$, $X^2$, and $X^3$ are individually selected from the group of hydrogen, hydroxyl, alkyl, alkoxy and halogen. One particularly useful benzophenone is 4-dodecyloxy-2-hydroxy benzophenone.

Typical substituted benzotriazoles have the general formula

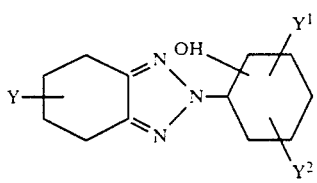

wherein Y, $Y^1$, and $Y^2$ are individually selected from the group of hydrogen, hydroxy, alkyl, and a halogen. A useful substituted benzotriazole is (2-($2^1$-hydroxy-$5^1$-methylphenyl) benzotriazole. Also useful are the hydroxyphenyl benzotriazoles marketed by Ciba-Geigy known as Tinuvin products, which are disclosed in U.S. Pat. Nos. 4,314,933, 4,426472, 4,344,876, and U.S. Pat. No. 4,426,471. Tinuvin 1130 has been found to be particularly effective, in clear coats. The substituted benzophenones and substituted benzotriazoles are preferably employed as ultraviolet screener additives in the clear coat as described hereinafter.

The amount of stabilizer present in the molded polyolefinic thermoplastic resin composition can range from about zero to about 0.5 per cent by weight of the thermoplastic composition depending upon the color pigmentation of the resin composition. For example, resin compositions color pigmented with carbon black may present sufficient resistance to UV deterioration without the need for additional organic UV stabilizer because carbon black itself can be an excellent UV absorber. Preferably, however, additional organic UV stabilizer is desirable even in those situations where the pigment has UV stabilizer characteristics. Similarly, organic UV stabilizers may not be needed in resin compositions color pigmented with a white pigment since they function to reflect and absorb ultraviolet radiation. Even so, it is preferable to include additional organic UV stabilizer. Moldable resin compositions color pigmented with other color pigments and additives, e.g. blues, greens, reds, etc., may require a stabilizing amount of a UV stabilizer which generally ranges from about 0.1 to about 0.6 weight per cent of the polymer resin composition. This range is preferable with all pigments, although, as indicated, an operative range in the case of pigments having high UV protecting characteristics the range is extended to 0 to 0.6. It is presently preferred to use a hindered amine, especially oligomeric hindered amines, as the ultraviolet radiation stabilizer at about 0.3 weight per cent level for TPO and at about 0.4 weight per cent level in modified TPO.

Examples of other components which can be added to the thermoplastic resin composition of this invention includes various stabilizers such as antioxidants, weatherability improvers, thermal degradation inhibitors, antistatic agents, and lubricants or plasticizers.

The thermoplastic resin compositions of this invention can be prepared, for example, by kneading the above components by means of a mixing device such as a single screw extruder, a twin screw extruder, a Banbury mixer, a roll or a Brabender plastogram and cooling and solidifying the mixture. Products may also be produced by polymerization reaction.

The shaped substrates 14, for example bumper fascia 12, can be produced by a conventional shaping process, for example an injection molding process, from the polyolefinic thermoplastic resin compositions of the invention. The resulting shaped substrates 14 exhibit excellent rigidity, resistance to impact at a low temperature, resistance to thermal deformation, and appearance.

The clear coating material 18 that can be used according to the invention comprises any suitable film forming material conventionally used in this art including acrylics, alkyds, polyurethanes, polyesters, and aminoplast resins. The clear coat material utilizable for protecting the color pigmented substrate should be flexible, transparent, and excellent in elongation and adhesion to the substrate. In addition, the clear coat should exhibit high resistance to weathering action, abrasion, heat, and the like.

The film forming synthetic materials mentioned above and methods for forming these materials are well known in the art. Moreover, the use of these materials as pigmented or clear coating materials is well known in the art.

The clear coating material 18 can be deposited into the substrate vat of an aqueous carrier, or vat of conventional volatile organic solvents such as aliphatic, cycloaliphatic, and aromatic hydrocarbons, esters, ethers, ketones, alcohols, and the like.

The clear coating material 18 can be applied to the plastic substrate by any conventional method in this art such as brushing, spraying, dipping, flow coating, etc. Typically, spray application is used, especially for automotive finishing. Various types of spraying can be utilized such as compressed air spraying, electrostatic spraying, hot spraying techniques, airless spraying techniques, etc. Also, these can be done by hand or by machine. The transparent clear coat should be applied at about 0.8 mils to 2.5 mils dry film thickness. After application of the clear coat, the coated substrate can be subjected to sufficient heat to drive off solvent in the case of thermoplastic coating materials and at temperatures sufficient to cure and/or cross-link in the case of thermosetting resin coating materials as is done conventionally in this art.

According to the invention, a clear coating material 18 comprising a film material, e.g. acrylics, polyurethanes, or other resins, has incorporated therein an effective UV screening amount of at least one UV screener material selected from hydroxybenzophenones, hydroxyphenylbenzotriazoles, benzoates, and other known compounds that function as UV screeners. A presently preferred ultraviolet screener is Tinuvin 1130 which is a liquid UV absorber or screener of the hydroxyphenyl benzotriazole class marketed by Ciba-Geigy.

The amount of UV screener or absorber in the clear coating 18 can vary appreciably depending upon the results desired for the color pigmented plastic substrate, but generally the amount will be about 0.1% to about 5%, preferably about 3%, weight per cent based upon total amount of clear coat. The UV screener serves to inhibit light transmittance through the clear coating 18 and thereby extend the aesthetic effect as well as the physical properties of the color pigmented plastic substrate 12.

Thus, according to the invention, by applying a clear coating 18 with UV screeners to the plastic substrate 14 containing UV stabilizers or carbon black, white, or other pigments the substrate will not absorb as much UV light which will extend its life. By screening the light, the invention not only improves initial color and property retention but also opens the door for a wider selection of pigments in the colorization process. This is because automotive manufacturers allow for certain of color shift over a specified time period and by screening light, pigments which previously failed may now pass. Properties such as impact strength, and elongation are better retained which is important to exterior automotive applications. Therefore, there truly is a cooperation between the clear coat, UV screener and the UV stability of the substrate.

In another embodiment of the invention, metallizing particles are incorporated into the clear coating 18 to provide a finish having excellent gloss, appearance, and metallic glamour.

The metallizing particles that can be used are any of those that provide a finish with metallic glamour. These include any of the conventional metallic flake pigments, such as aluminum flake, nickel flake, nickel-chrome flake, as well as other known mineral flake materials, such as mica, that can be used to metallize the appearance of the finish for the color pigmented plastic substrate 14 coated with the instant clear coating 18. Generally, aluminum flake pigment is used. The clear coating 18 can contain from 0.2-20 per cent by weight of an aluminum flake pigment.

It thus will be seen that the objects of this invention have been fully and effectively accomplished. It will be realized, however, that the foregoing preferred specific embodiments have been shown and described for the purpose of illustrating the functional and structural principles of this invention and are subject to change without departure from such principles. Therefore, this invention includes all modifications encompassed within the spirit and scope of the following claims.

What is claimed is:

1. An exterior automotive vehicle component which is provided for exterior appearance purposes or is of such large size as to materially contribute to the exterior appearance of the vehicle comprising
   a substrate of thermoplastic polyolefin composition defining the shape of the component,
   said substrate having exterior surface means defining the exterior configurational appearance of the component,
   said composition having pigmentation therein defining the color of said exterior surface means,
   a coating of clear material on said exterior surface means enabling the exterior color and configurational appearance to have an enhanced luster and mar resistance,
   said composition having an ultraviolet radiation deterioration preventing agent therein,
   said clear material having an ultraviolet radiation screening agent therein,
   the amount of ultraviolet radiation screening agent in said clear material cooperating with the amount of ultraviolet radiation deterioration preventing agent in said composition such as to provide a level of resistance to UV deterioration acceptable in the exterior vehicular environment of the component while accommodating a tenacity of adherence of the coating to the substrate acceptable in the exterior vehicular environment of the component.

2. A component as defined in claim 1 wherein said clear material includes fine metallizing particles generally evenly distributed in the coating, the amount of said particles being such that the color of the substrate is presented as the color appearance of the component with the particles imparting a three-dimensional metallized enhancement to the color appearance.

3. A component as defined in claim 2 wherein the metallized particles are aluminum flakes.

4. A component as defined in claim 1 wherein said ultraviolet radiation deterioration preventing agent present in said composition is carbon black, white, or other pigment.

5. A component as defined in claim 4 wherein the amount of ultraviolet radiation screening agent present in said clear material ranges from about 0.1 to about 5 per cent by weight based upon total amount of clear coat.

6. A component as defined in claim 1 wherein said ultraviolet radiation deterioration preventing agent in said composition is a hindered amine and is present in amounts ranging up to about 0.6 per cent by weight of the thermoplastic composition.

7. A component as defined in claim 5 wherein said clear material contains from about 0.1 to about 5 per cent by weight of a substituted benzophenone or substituted benzotriazole as the ultraviolet radiation screening agent.

8. A component as defined in claim 7 wherein said clear material includes fine metallizing particles generally evenly distributed in the coating, the amount of said particles being such that the color of the substrate is presented as the color appearance of the component with the particles imparting a three-dimensional metallized enhancement to the color appearance.

9. A component as defined in claim 8 wherein the metallizing particles are aluminum flakes.

10. A component as defined in claim 4 wherein said composition additionally contains an organic ultraviolet stabilizer.

11. A component as defined in claim 10 wherein said organic stabilizer is a hindered amine.

* * * * *